No. 640,122. Patented Dec. 26, 1899.
A. L. FOREMAN.
APPARATUS FOR COOLING AND AERATING MILK.
(Application filed July 5, 1899.)
(No Model.)
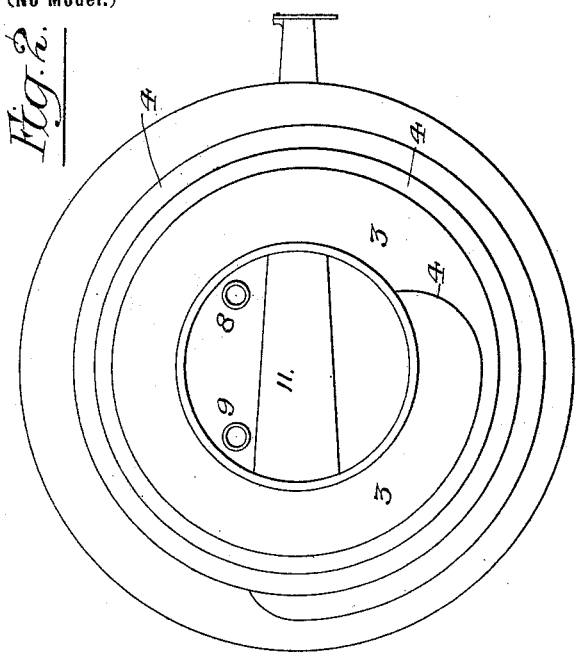
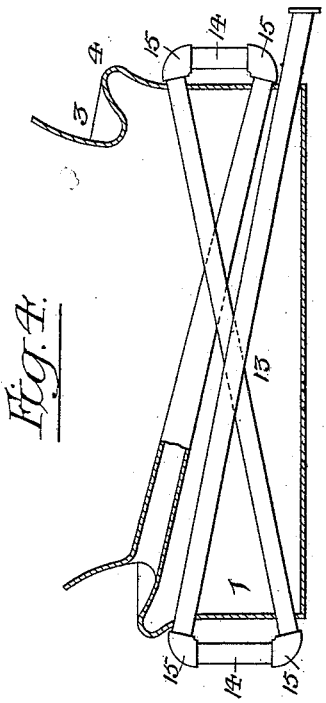
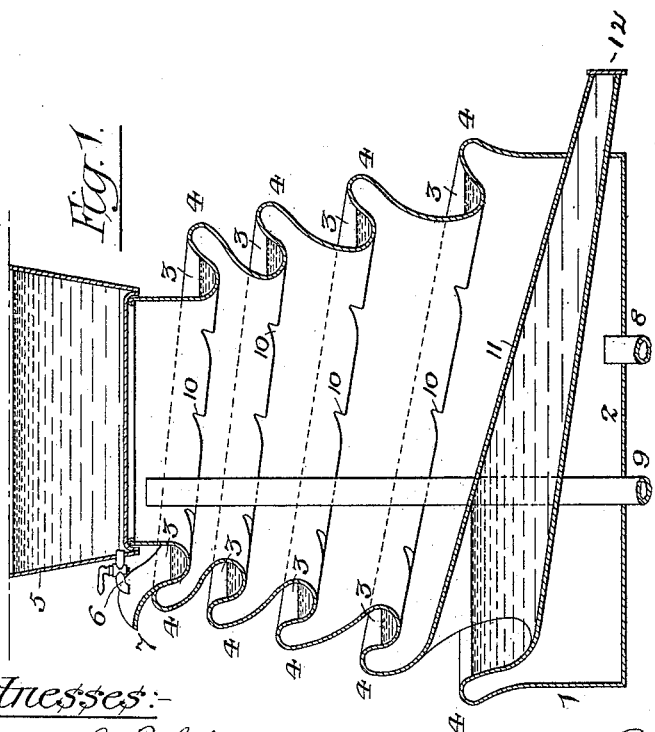
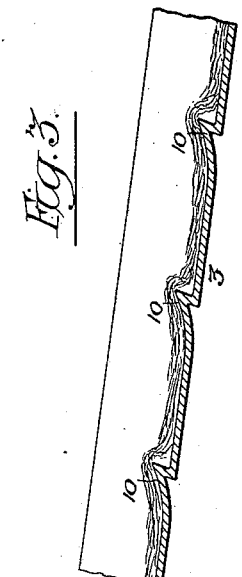
Witnesses:-
Robert S. Blake
Louis H. Whitehead
Inventor:-
Amos L. Foreman.
by his Attorneys:-
Howson & Howson

UNITED STATES PATENT OFFICE.

AMOS L. FOREMAN, OF WILMERDING, PENNSYLVANIA.

APPARATUS FOR COOLING AND AERATING MILK.

SPECIFICATION forming part of Letters Patent No. 640,122, dated December 26, 1899.

Application filed July 5, 1899. Serial No. 722,866. (No model.)

*To all whom it may concern:*

Be it known that I, AMOS L. FOREMAN, a citizen of the United States, and a resident of Wilmerding, Pennsylvania, have invented certain Improvements in Apparatus for Cooling or Sterilizing and Aerating Milk, of which the following is a specification.

My invention consists of a simple and effective form of milk cooler and aerator, which is available also as a sterilizer, the device being very compact and yet insuring extensive travel of the milk, while the same is subjected throughout a large area to cooling or heating effect, provision being also made for interrupting the flow at frequent intervals, so as to cause a breaking up of the current and the desired aeration of the milk, and means being provided for storing the cooled milk until it has accumulated in sufficient quantity to fill a can, into which it can therefore be rapidly withdrawn, so as not to be again heated or contaminated, as it might be if allowed to flow slowly and in a small stream from the cooler into the can.

In the accompanying drawings, Figure 1 is a vertical section of a milk cooler and aerator or sterilizer constructed in accordance with my invention. Fig. 2 is a plan or top view of the same. Fig. 3 is a longitudinal section of part of one of the troughs, this view being on a somewhat larger scale than the others; and Fig. 4 is a sectional view of the lower portion of the structure, showing a special construction of the milk-storing device.

The structure comprises a box or casing 1, of sheet metal, preferably closed at the bottom 2 and open at the top, the sides of said box throughout the greater portion of its extent being so bent as to form a spiral trough 3 with hollow outer wall 4. Upon the top of the box can be mounted a milk-pail 5, which can discharge through a suitable spigot 6 into the uppermost convolution of the trough 3, a guard-plate 7 serving to prevent the splashing of the milk out of the trough. The convolutions of the trough 3 gradually increase in pitch from top to bottom, as shown in Fig. 1, so that a substantially uniform rate of flow of the milk through the trough will be maintained, the gradually-increased pitch of the trough compensating for the gradual lessening of the speed of flow, which would otherwise result as the milk became cooled.

The interior of the box or casing 1 is intended to be filled with ice or cold water, and in the latter case constant circulation of the water through the casing can be maintained by the use of pipes 8 and 9, one communicating with the lower portion of the box and the other with the upper portion of the same.

As the spiral trough 3 has a hollow outer wall 4, the cooling medium acts upon the bottom and both sides of the flowing stream of milk. Hence the rapid cooling of the same is effected, and in order to provide for the aeration of the milk as it flows along the spiral trough the bottom of the latter has at intervals raised ribs or ledges 10, as shown in Fig. 3, over which the stream of milk pours, so as to break up the continuity of the stream at frequent intervals and insure correspondingly-frequent admixture of air therewith.

The lowermost convolution of the trough 3 communicates with a transverse pipe 11, of large diameter, passing through the lower portion of the box, where the temperature is lowest, and having a gate-valve 12 or like stopping device at its lower end, so that the cooled milk may be permitted to accumulate in this pipe and may be stored therein until enough has accumulated to fill a can or other receptacle, the valve 12 being then opened and the stored volume of cold milk rapidly drawn off, so that it will not be again heated or contaminated by its passage through the air, the cold milk being in contact with the air but a short time during its withdrawal.

In some cases I prefer to use in order to form a storage-chamber a series of pipes 13, extending back and forth through the lower portion of the cooling-chamber, as shown in Fig. 4, and connected by short pipes 14 and elbows 15 outside of the casing, the pipes and elbows being separable for cleansing purposes.

When using the device as a sterilizer, hot water or steam may be introduced into the box instead of cold water or ice, the box of course being closed at the top in case steam is used.

Considering the extent of travel for the milk afforded by the spiral trough 3 the device is extremely compact and all parts of it are readily accessible for cleansing, as is necessary in a device of this sort where sanitary conditions are so important.

The successive convolutions of the trough gradually increase in diameter as well as in pitch, so as to increase the length of the flow-passage and impart a general conical shape to the structure, thereby providing the same with a broad base and overcoming any liability to accidental tipping or overturning when a heavy pail of milk is mounted upon it.

Having thus described my invention, I claim and desire to secure by Letters Patent—

1. The within-described milk cooler or sterilizer consisting of a box or casing of sheet metal for the reception of the cooling or heating agent, said box or casing having sides forming a spiral trough with hollow outer wall communicating with the interior, substantially as specified.

2. The within-described milk cooler or sterilizer consisting of a box or casing of sheet metal for the reception of the cooling or heating agent, said box or casing having around it a spiral trough of gradually-increasing pitch from top to bottom, substantially as specified.

3. The within-described milk cooler or sterilizer consisting of a box or casing of sheet metal for the reception of the cooling or heating agent, said box or casing having around it a spiral trough with successive convolutions of gradually-increasing pitch and gradually-increasing diameter, substantially as specified.

4. A milk cooler or sterilizer consisting of a box or casing having a spiral trough for the passage of the milk and having ribs or obstructions projecting above the bottom of the trough at intervals, so as to cause breaks in the flow of the current, substantially as specified.

5. A milk cooler or sterilizer consisting of a box or casing having a spiral trough for the flow of the milk, and having one or more discharge-tubes extending transversely across the lower portion of the casing and communicating with the lower convolution of the trough, said transverse discharge tube or tubes constituting a receiver in which a large volume of milk can be stored, substantially as specified.

6. A milk cooler or sterilizer consisting of a box or casing having a spiral trough for the flow of the milk, and having a series of transverse tubes in the lower portion, serving to convey the milk from the lower convolution of the trough to the outlet, said tubes having detachable connections outside of said box or casing, substantially as specified.

In testimony whereof I have signed my name to this specification in the presence of two subscribing witnesses.

AMOS L. FOREMAN.

Witnesses:
   H. F. REARDON,
   F. E. BECHTOLD.